(12) United States Patent
Hutchens et al.

(10) Patent No.: US 10,814,222 B2
(45) Date of Patent: Oct. 27, 2020

(54) GAMING CONTROLLER WITH ADAPTABLE INPUT CONFIGURATIONS

(71) Applicant: Logitech Europe S.A., Lausanne (CH)

(72) Inventors: Kyle David Hutchens, Daly City, CA (US); Robert Jetter, Pleasanton, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 30 days.

(21) Appl. No.: 16/138,676

(22) Filed: Sep. 21, 2018

(65) Prior Publication Data

US 2020/0094136 A1    Mar. 26, 2020

(51) Int. Cl.
    A63F 13/22    (2014.01)
    A63F 13/24    (2014.01)
    A63F 13/23    (2014.01)

(52) U.S. Cl.
    CPC .............. *A63F 13/22* (2014.09); *A63F 13/23* (2014.09); *A63F 13/24* (2014.09); *A63F 2300/1043* (2013.01)

(58) Field of Classification Search
    CPC combination set(s) only.
    See application file for complete search history.

(56) References Cited

U.S. PATENT DOCUMENTS

| | | | |
|---|---|---|---|
| 5,558,577 A | 9/1996 | Kato | |
| 5,605,505 A | 2/1997 | Han | |
| 5,624,117 A | 4/1997 | Ohkubo et al. | |
| 5,645,277 A | 7/1997 | Cheng | |
| 5,706,278 A * | 1/1998 | Robillard | H04L 12/40156 370/222 |
| 5,806,849 A | 9/1998 | Rutkowski | |
| 5,838,307 A | 11/1998 | Bouton | |
| 6,004,210 A | 12/1999 | Shinohara | |
| 6,053,814 A | 4/2000 | Pchenitchnikov et al. | |
| 6,102,802 A | 8/2000 | Armstrong | |
| 6,238,289 B1 | 5/2001 | Sobota et al. | |
| 6,264,558 B1 | 7/2001 | Nishiumi et al. | |
| 6,346,047 B1 | 2/2002 | Sobota et al. | |
| 6,501,459 B1 | 12/2002 | Takigawa et al. | |
| 6,524,187 B2 | 2/2003 | Komata | |
| 6,572,108 B1 | 6/2003 | Bristow | |
| 6,881,147 B2 | 4/2005 | Naghi et al. | |

(Continued)

*Primary Examiner* — Tramar Y Harper
*Assistant Examiner* — Jeffrey K Wong
(74) *Attorney, Agent, or Firm* — Patterson & Sheridan, LLP

(57) ABSTRACT

A gaming controller is provided. The gaming controller includes a controller; a plurality of input positions; and a plurality of input modules, each input module configured to receive user input to the gaming controller. The plurality of input modules are connected to the controller to form a ring network. Each of the plurality of input modules is connected to the ring network through a different one of the input positions. The controller is configured to initiate a transmission of a data packet around the ring network, and each input module is configured to enter data into a different section of the data packet. Each input module is configured to determine the section of the data packet to enter data into based on one or more of (1) a type of that input module and (2) whether one or more sections of the data packet already include data from one of the input modules.

22 Claims, 10 Drawing Sheets

(56) References Cited

U.S. PATENT DOCUMENTS

| | | |
|---|---|---|
| 7,116,310 B1 | 10/2006 | Evans et al. |
| 7,297,061 B2 | 11/2007 | Siegel |
| 7,369,117 B2 | 5/2008 | Evans et al. |
| 7,427,980 B1 | 9/2008 | Partridge et al. |
| 7,625,286 B2 | 12/2009 | Hamada |
| 7,631,124 B2 | 12/2009 | Lockhart et al. |
| 7,737,944 B2 | 6/2010 | Harrison et al. |
| 7,758,424 B2 | 7/2010 | Riggs et al. |
| 7,837,559 B2 | 11/2010 | Kidakarn |
| 7,874,918 B2 | 1/2011 | Osnato et al. |
| 7,927,216 B2 | 4/2011 | Ikeda et al. |
| 7,970,147 B2 | 6/2011 | Mao |
| 7,976,385 B2 | 7/2011 | Riggs et al. |
| 8,070,571 B2 | 12/2011 | Argentar |
| 8,115,588 B2 | 2/2012 | Numata et al. |
| 8,142,287 B2 | 3/2012 | Podoloff |
| 8,187,095 B2 | 5/2012 | Wong et al. |
| 8,241,126 B2 | 8/2012 | Ambinder et al. |
| 8,313,379 B2 | 11/2012 | Ikeda et al. |
| 8,360,882 B2 | 1/2013 | Liu |
| 8,376,858 B2 | 2/2013 | Rose et al. |
| 8,388,425 B2 | 3/2013 | Kamiya |
| 8,403,754 B2 | 3/2013 | Kuo et al. |
| 8,491,388 B2 | 7/2013 | Miyazaki |
| 8,509,707 B2 | 8/2013 | Rofougaran et al. |
| 8,523,675 B2 | 9/2013 | Young et al. |
| 8,545,323 B2 | 10/2013 | McVicar et al. |
| 8,562,433 B2 | 10/2013 | Marks et al. |
| 8,568,213 B2 | 10/2013 | Osnato et al. |
| 8,574,050 B2 | 11/2013 | Osnato et al. |
| 8,602,894 B2 | 12/2013 | Marks et al. |
| 8,613,669 B1 | 12/2013 | McCauley |
| 8,641,525 B2 | 2/2014 | Burgess et al. |
| 8,657,682 B2 | 2/2014 | Lai |
| 8,715,080 B2 | 5/2014 | Yasuda et al. |
| 8,753,206 B2 | 6/2014 | Ali et al. |
| 8,753,210 B2 | 6/2014 | Ikeda et al. |
| 8,835,740 B2 | 9/2014 | Riopelle |
| 8,932,135 B2 | 1/2015 | Coe |
| 8,961,311 B2 | 2/2015 | Lee |
| 9,017,168 B2 | 4/2015 | Lee |
| 9,089,770 B2 | 7/2015 | Burgess et al. |
| 9,116,555 B2 | 8/2015 | Nakayama et al. |
| 9,174,122 B2 | 11/2015 | Miyazaki |
| 9,261,968 B2 | 2/2016 | Yen et al. |
| RE45,905 E | 3/2016 | Ikeda et al. |
| 9,289,688 B2 | 3/2016 | Burgess et al. |
| 9,308,450 B2 | 4/2016 | Burgess et al. |
| 9,308,451 B2 | 4/2016 | Burgess et al. |
| 9,352,229 B2 | 5/2016 | Burgess et al. |
| 9,393,487 B2 | 7/2016 | Zalewski et al. |
| 9,427,660 B2 | 8/2016 | Lum et al. |
| 9,492,744 B2 | 11/2016 | Burgess et al. |
| 9,504,911 B2 | 11/2016 | Hackney |
| 9,526,995 B2 | 12/2016 | Brunstetter et al. |
| 9,533,219 B2 | 1/2017 | Burgess et al. |
| 9,550,116 B2 | 1/2017 | Burgess et al. |
| 2002/0057709 A1* | 5/2002 | Edmon .................. H04J 3/1694 370/442 |
| 2005/0255915 A1* | 11/2005 | Riggs ...................... A63F 13/06 463/37 |
| 2006/0025217 A1 | 2/2006 | Hussaini et al. |
| 2006/0250351 A1 | 11/2006 | Fu |
| 2009/0054146 A1* | 2/2009 | Epstein .................. A63F 13/06 463/38 |
| 2009/0122006 A1 | 5/2009 | Nielsen et al. |
| 2009/0205878 A1 | 8/2009 | Taylor |
| 2011/0118024 A1 | 5/2011 | Lukas et al. |
| 2011/0118025 A1 | 5/2011 | Lukas et al. |
| 2012/0322555 A1 | 12/2012 | Burgess et al. |
| 2013/0267320 A1 | 10/2013 | Burgess et al. |
| 2014/0018173 A1 | 1/2014 | Urhman |
| 2015/0105152 A1* | 4/2015 | Bellinghausen .... A63F 13/2145 463/31 |
| 2015/0205381 A1 | 7/2015 | Eng et al. |
| 2015/0297993 A1 | 10/2015 | Burgess et al. |
| 2015/0297994 A1 | 10/2015 | Burgess et al. |
| 2016/0082349 A1 | 3/2016 | Burgess et al. |
| 2016/0193529 A1 | 7/2016 | Burgess et al. |
| 2016/0228766 A1 | 8/2016 | Kissoon |
| 2016/0296837 A1 | 10/2016 | Burgess et al. |
| 2016/0310841 A1 | 10/2016 | Offerdahl III |
| 2016/0317918 A1 | 11/2016 | Gassoway et al. |
| 2016/0317919 A1 | 11/2016 | Gassoway et al. |
| 2016/0317920 A1 | 11/2016 | Schmitz et al. |
| 2016/0317921 A1 | 11/2016 | Schmitz et al. |
| 2016/0339339 A1 | 11/2016 | Miyamoto et al. |
| 2016/0346680 A1 | 12/2016 | Tsai et al. |
| 2016/0346681 A1 | 12/2016 | Tsai et al. |
| 2016/0346682 A1 | 12/2016 | Burgess et al. |
| 2016/0361634 A1 | 12/2016 | Gassoway et al. |
| 2016/0361636 A1 | 12/2016 | Gassoway et al. |
| 2017/0001107 A1 | 1/2017 | Burgess et al. |
| 2017/0001108 A1 | 1/2017 | Burgess et al. |
| 2017/0043247 A1 | 2/2017 | Hackney |
| 2017/0087456 A1 | 3/2017 | Burgess et al. |

\* cited by examiner

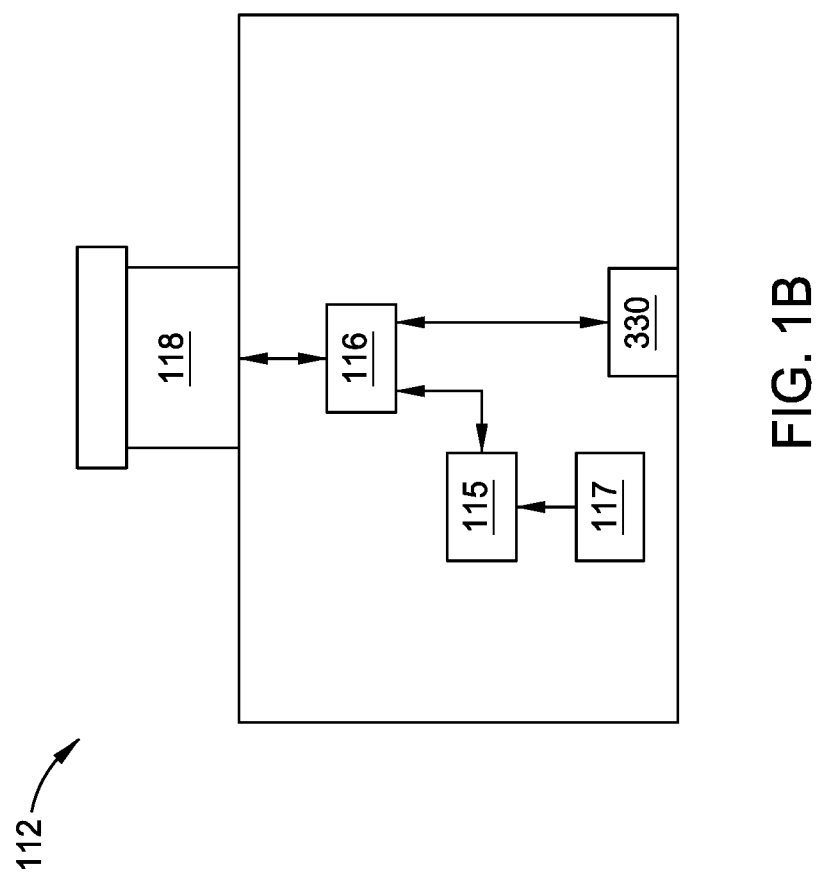

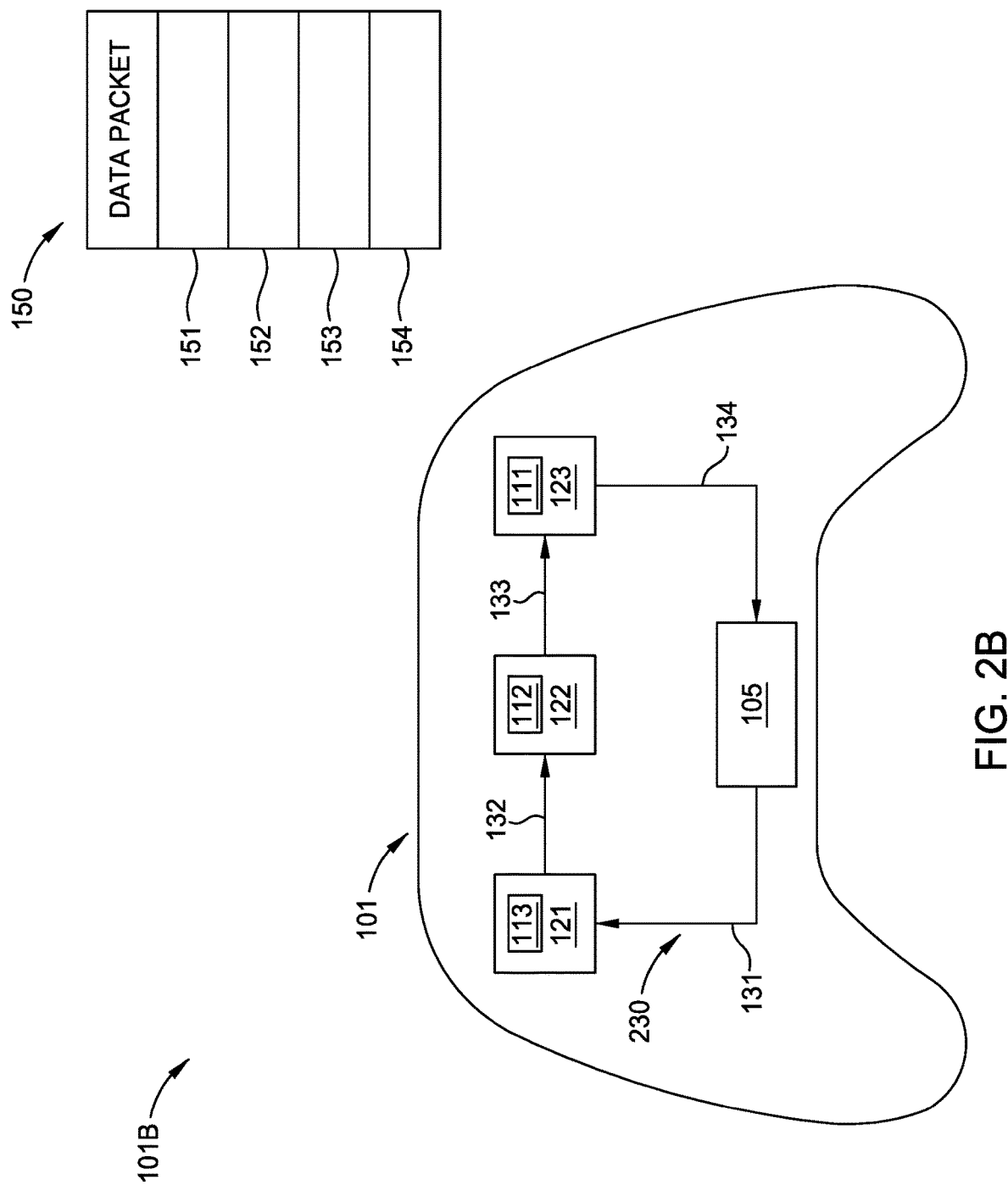

GAMING CONTROLLER WITH ADAPTABLE INPUT CONFIGURATIONS

BACKGROUND

Field

Embodiments of the present disclosure generally relate to gaming controllers that include adaptable input configurations.

Description of the Related Art

Gaming controllers can include various input devices, such as analog sticks (e.g., joystick), directional pads (also referred to as d-pads), trackballs, individual buttons, and more. The position of these input devices on a given controller is generally fixed to specific locations on the gaming controller, since most conventional gaming controllers are formed as one monolithic assembly. However, many users prefer to have certain input devices at different locations than the factory default positions. Switching the position of an input device (e.g., an analog stick input) with another input device (e.g., a d-pad) on current gaming controllers is either not possible for a typical user or is at least a time-consuming process requiring substantial reconfiguration due to hardware limitations or software limitations of the gaming controller.

Moreover, the hardware components of the input devices within a gaming controller often wear out rapidly and at uneven rates when used regularly. A hardware component's lifetime is often undesirably short when used in gaming tournaments and other high-use situations. As the hardware components wear out, the user's input to the gaming controller and gaming system become less reliable or non-existent, and thus the worn-out components must be replaced. However, since most conventional game controllers do not include separable input devices the whole gaming controller must be replaced, which is typically leads to system downtime and a large cost to the user to replace the whole gaming controller.

Therefore, there is a need for an improved gaming controller to allow users to replace and/or adjust the positions of one or more input devices to meet their preferences and/or application needs.

SUMMARY

Embodiments of the present disclosure generally relate to gaming controllers including adaptable input module configurations. In one embodiment, a gaming controller is provided. The gaming controller includes a controller; a plurality of input positions; and a plurality of input modules, each input module configured to receive user input to the gaming controller, wherein the plurality of input modules are connected to the controller to form a ring network. Each of the plurality of input modules is connected to the ring network through a different one of the input positions. The controller is configured to initiate a transmission of a data packet around the ring network, and each input module is configured to enter data into a different section of the data packet. Each input module is configured to determine the section of the data packet to enter data into based on one or more of (1) a type of that input module and (2) whether one or more sections of the data packet already include data from one of the input modules.

In another embodiment, a method of operating a gaming controller is provided. The gaming controller includes a controller, a plurality of input modules, and a plurality of input positions. The method includes transmitting a data packet form the controller around a ring network formed by the controller and the plurality of input modules, wherein each of the plurality of input modules is connected to the ring network through a different one of the input positions; and entering data into the data packet by each of the plurality of input modules, wherein each input module is configured to enter data into a different section of the data packet, and each input module determines the section of the data packet to enter data into based on one or more of (1) a type of that input module and (2) whether one or more sections of the data packet already include data from one of the input modules.

Embodiments of the present disclosure also relate to an input module configured to be replaceably positioned at an input position on a gaming controller. The input module includes a connection interface that includes four electrical connection elements that are configured to mate with corresponding electrical connection elements disposed within the input position of the gaming controller, and a controller that is configured to receive a signal received at a first electrical connection element of the four electrical connection elements and transmit a signal to a second electrical connection element of the four electrical connection elements. The controller includes a sensor that is configured to detect input provided from a user of the gaming controller and generate gaming data based on the input provided from the user, a processing unit, and a non-volatile memory having a number of instructions stored therein. The instructions which, when executed by the processing unit, causes the input module to perform operations including entering information into a data packet received at the first electrical connection element, wherein the entered information comprises the gaming data generated by the sensor, and transmitting the data packet containing the entered information to the second electrical connection element. The process of entering information into a data packet may also include determining a section of the data packet to enter the information into based on one or more of (1) information stored in memory relating to a type of input module the input module is and (2) whether one or more sections of the data packet already include data from another input module.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 1B is a perspective view of a first input module, according to one embodiment.

FIG. 2B is a block diagram of the gaming controller in the second configuration illustrating how data is transferred between the input modules and the controller, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to gaming controllers that include replaceable and adaptable input module configurations. Embodiments of the disclosure provided herein include gaming controllers that include features that allow a user to quickly remove, replace and/or reposition the input modules of the gaming controller without requiring the user to take any additional device configuration steps other than positioning of the input module within the gaming controller. For example, a user can switch the position of a first input module (e.g., a first analog stick input) with the position of a second input module (e.g., a second analog stick input) and continue interacting with the game running on the gaming console without any additional device configuration steps to be performed by the user. The input modules are generally arranged in a ring network to communicate with a central controller of the gaming controller. The central controller transmits a data packet that is transferred around the ring network. Upon receiving the data packet, the input modules enter data into the data packet and then serially transmit the data packet to the next input module in the ring network with the last input module transmitting the data packet back to the central controller. Each input module is configured to enter data into a different section of the serially transmitted data packet. In some embodiments, each input module determines the section of the data packet to enter data into based on one or more of (1) a type of that input module and (2) whether one or more sections of the data packet already include data from one of the input modules.

For example, when an analog stick input module is positioned to be the first analog stick input in a ring network that has two or more input modules arranged in the ring network from left to right, the analog stick input module can enter data into a section of the data packet that is automatically designated for a left analog stick input module. Similarly, when another analog stick input module is positioned to not be the first analog stick input in the ring network, this other analog stick input module can enter data into another section of the data packet that is automatically designated for an analog stick input module at another location (e.g., right analog stick input module). Thus, a user can rearrange the input modules and resume or start interacting with a program running on a gaming console without having to perform any additional device configuration steps other than simply rearranging the input modules.

Figure 1A:
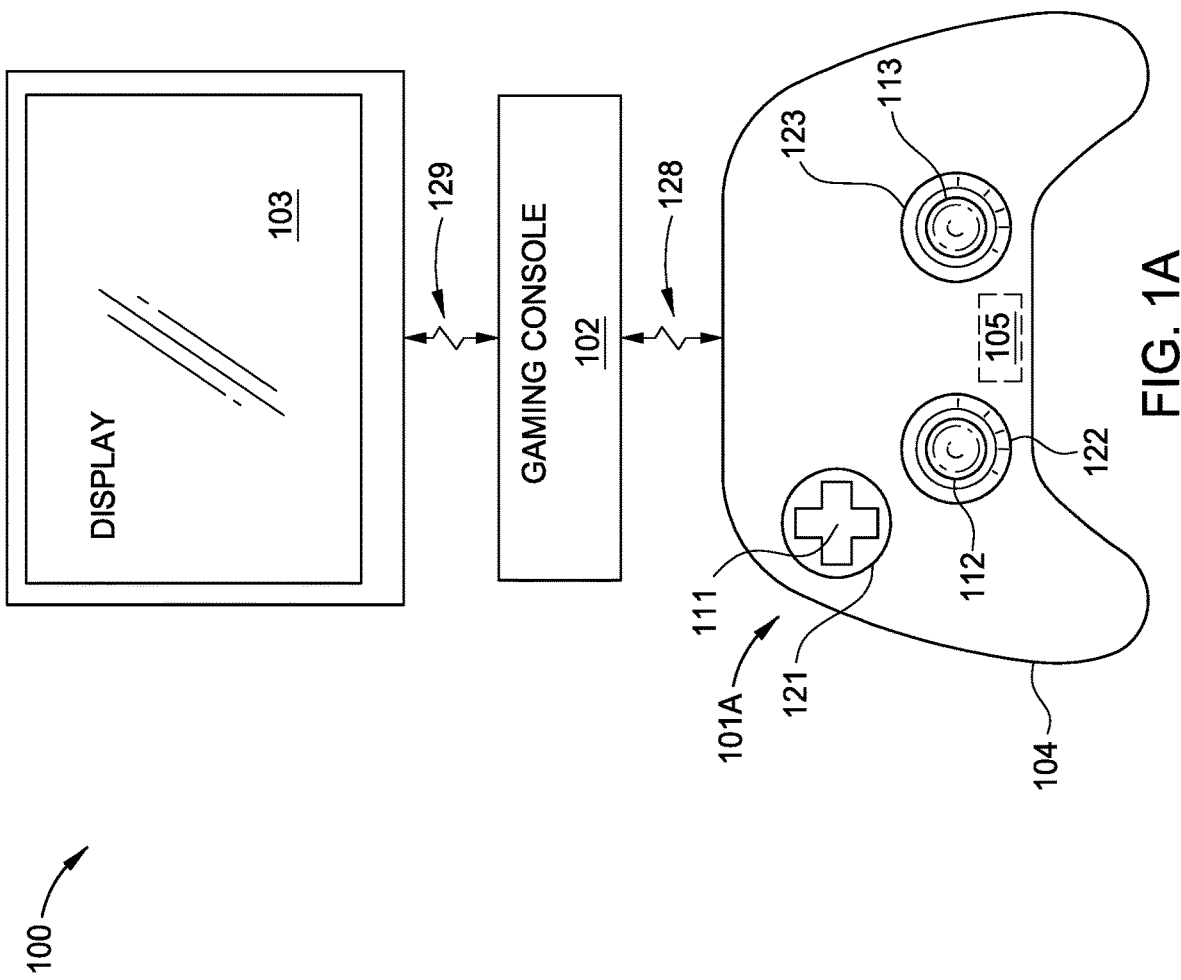
FIG. 1A is a perspective view of a video game system with the input modules arranged in a first configuration, according to one embodiment.

FIG. 1A is a perspective view of a video game system 100, according to one embodiment. The video game system 100 includes a gaming controller 101, a gaming console 102, and a display 103. The gaming console 102 can run a program (e.g., a video game) that a user (not shown) can interact with, for example by playing a video game displayed on the display 103. The user will thus interact with the game running on the gaming console 102 using the gaming controller 101. The gaming controller 101 is in communication with gaming console 102 using a wired or a wireless communication link 128, and the gaming console 102 is in communication with the display 103 using a wired or a wireless communication link 129.

The gaming controller 101 includes features that allow the user to quickly remove, replace and/or reposition an input module positioned within the gaming controller 101 and then start or resume interacting with the game running on the gaming console 102 without any additional device configuration steps, such as hardware configuration steps (e.g., adjusting a potentiometer, dip switches, or other input) or software configuration steps required by the user other than positioning the input module within the gaming controller 101.

As shown in FIG. 1A, in one configuration, the gaming controller 101 includes a housing 104, a controller 105, and three input modules 111-113. Each input module 111-113 is configured to receive and transmit user input to the controller 105 in the form of an electrical signal, such as electrical signal data indicating how a user has manipulated a user input element (e.g., user input element 118 of analog stick input module 112 described below in reference to FIG. 1B) of the input module. In some embodiments, at least one input module disposed within the gaming controller 101 is a different type of input module from the other input modules. For example, the second input module 112 and the third input module 113 can be analog stick modules while the first input module 111 can be a d-pad. Although the following disclosure describes embodiments of gaming controllers having three input modules, the advantages of this disclosure can be applied to gaming controllers having two input modules or more than three input modules. For example, even if there are only two inputs of the same type (e.g., two analog stick input modules) within the gaming controller 101 a user may still prefer to switch the position of the input modules for other reasons, such as attempting to extend the collective useful life of the analog stick input modules if the left or right analog stick input module is used substantially more than the other. In such a case, the user can quickly switch the position of the analog stick input modules without performing any additional device configuration steps other than switching the position of the analog stick input modules.

The gaming controller 101 further includes three input positions 121-123, where each input position 121-123 is configured to receive one of the input modules 111-113 through an opening in the housing 104. The input positions 121-123 are arranged with input position 121 on the left, input position 123 on the right, and input position 122 disposed between input positions 121 and 123. Each input position 121-123 can be an electrical socket or other receptacle that is configured to receive one of the input modules 111-113, so that the received input module 111-113 can communicate with other components of the gaming controller 101, such as the controller 105. Each input position 121-123 is configured to receive any one of the input modules 111-113 allowing the user to replace and/or rearrange the input modules 111-113 based on the user's preferences.

FIG. 1A illustrates the input modules 111-113 arranged in a first configuration 101A with the input modules 111-113 located at input positions 121-123 respectively. FIG. 2A shows the input modules 111-113 arranged in a second configuration 101B in which the input modules 111-113 are arranged at different input positions (described in more detail below) relative to the first configuration 101A. Although the position of these input modules has been switched from the first configuration 101A to the second configuration 101B, no extra device configuration steps are needed in order for the user's inputs to be properly processed by the controller 105 of the gaming controller 101 and the processing components in the gaming console 102. No extra configuration is needed because the gaming controller 101 uses an improved hardware configuration and communication technique that allows data from the input modules 111-113 to be properly arranged for processing by the controller 105 and gaming console 102 regardless of the position of the various input modules 111-113 on the gaming controller 101 as described below in reference to FIGS. 1D and 2C.

FIG. 1B is a perspective view of an input module, which for explanatory purposes is illustrated as the second input module 112 (i.e., an analog stick input module). The second input module 112 can include a processing unit 115 coupled to one or more input/output (I/O) devices 116, and to a memory unit 117. The one or more input/output (I/O) devices 116 is generally coupled to a user input element 118 so that input from the user can be detected by the electrical elements found in the one or more input/output (I/O) devices 116. The one or more input/output (I/O) devices 116 are generally coupled to the connection interface 330 that is in communication with the electrical elements found in the various input positions of the gaming controller, which is discussed further below. The input module illustrated in FIG. 1B is intended to broadly illustrate the general features of all of the input modules disclosed herein, and thus the discussion below is not intended to be limiting to an analog stick (e.g., joystick) type of input module which is illustrated in FIG. 1B. Moreover, although FIG. 1B is described in reference to the second input module 112, the other input modules 111, 113 and the controller 105 will generally include similar components (e.g., the processing unit, I/O devices, and memory unit) and can also function similarly, such as how these other input modules 111, 113 and the controller 105 transmit and receive data around the ring network 130, such as the data packet 150. The memory unit 117 can include data and one or more software applications stored therein (e.g., data and applications enabling the controller 105 and the input modules 111-113 to receive, process, and transmit the data packet 150).

The processing unit 115 may be any hardware unit or combination of hardware units capable of executing the one or more software applications and processing data, including, e.g., audio data and provided user input data. For example, processing unit 115 could be a central processing unit (CPU), a digital signal processor (DSP), an application-specific integrated circuit (ASIC), a combination of such units, and so forth. Processing unit 115 is configured to execute the software application(s), process the data packet 150, and communicate with I/O devices 116 among other operations. The software applications, which are stored within the memory unit 117, includes program code that may be executed by processing unit 115 will perform various functionalities associated with the input module. The one or more software applications can include instructions which when performed by the processing unit 115 within the controller 105 or input modules 111-113 can cause the processing unit to receive, process, and transmit received user input data and/or device information that is then transferred within at least a portion of the data packet 150.

The I/O devices 116 can include components enabling data derived from a user's manipulation of the user input element 118 of the second input module 112 to be communicated to the other devices in the ring network 130, such as the input modules 111, 113, and the controller 105. The I/O devices 116 within the input modules 111-113 will also include one or more sensors (not shown) that are adapted to receive input from a user and generate an output signal that is used by the gaming system to cause some change in a gaming software program running thereon. In some embodiments, the output signals provided by the sensors can be used directly or can be processed by the processing unit 115 within the input module 111-113, or controller 105, to form gaming data that is used by the software program(s) running on the gaming console 102 as user input. In some embodiments, the one or more sensors can include electronic switches, potentiometers, Hall Effect sensors, optical sensors, inductive type sensors, accelerometers, strain gauges, or other similar device(s) that are used to detect and/or measure aspects of a user's input supplied to input receiving components (e.g., buttons in a d-pad, joystick, touch pad, etc.) of the input element 118 within an input module 111-113. In one embodiment, the controller 105 and each input module 111-113 include a universal asynchronous receiver-transmitter (UART) interface for communicating on the ring network 130.

Figure 1C:
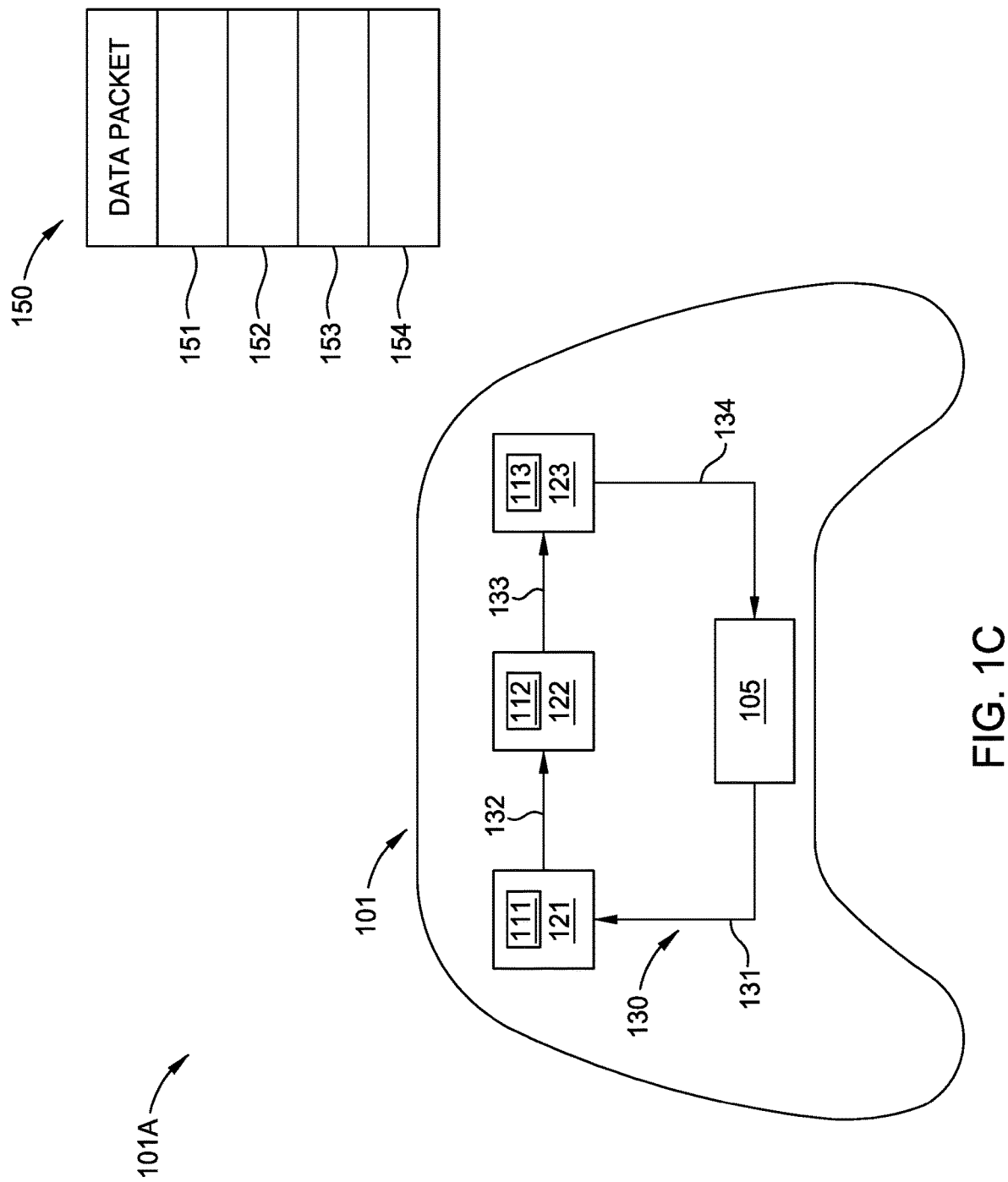
FIG. 1C is a block diagram of the gaming controller in the first configuration illustrating how data is transferred between the input modules and the controller, according to one embodiment.

FIG. 1C is a block diagram of the gaming controller 101 in the first configuration 101A illustrating how data is transferred between the input modules 111-113 and the controller 105, according to one embodiment. The input modules 111-113 serially communicate with each other and with the controller 105 across a ring network 130. Each of the plurality of input modules 111-113 is connected to the ring network 130 through a different one of the input positions 121-123.

In one embodiment, the controller 105 and input modules 111-113 can be configured to operate in a master-slave arrangement with the controller 105 acting as the master initiating communication across the ring network 130 and the input modules 111-113 acting as slaves in which each input module sequentially responds to the communication originally initiated by the controller 105. The controller 105 can initiate communication across the ring network by transmitting a data packet 150 to the input modules 111-113 with the controller 105 terminating the communication after receiving the data packet 150 back from the last input module 113 in the ring network 130. In some embodiments, the controller 105 can initiate the communication periodically at a fixed interval (e.g., 1 ms) to receive updated data from the input modules 111-113. This fixed interval can be synchronized with communication between the gaming console 102 and the gaming controller 101 to reduce impact on latency.

The ring network 130 includes (1) a first interconnect 131 connecting the controller 105 with the input module at the first input position 121, (2) a second interconnect 132 connecting the input module at the first input position 121 with the input module at the second input position 122, (3) a third interconnect 133 connecting input module at the second input position 122 with the input module at the third input position 123, and (4) a fourth interconnect 134 connecting the input module at the third input position 123 with the controller 105 to complete the ring.

The controller 105 can initiate the communication with the input modules 111-113 by transmitting a data packet 150 to the first input module 111 at the first input position 121. The initially transmitted data packet 150 can be a skeleton packet that is largely empty, so that the data packet is configured to be updated by input received from the processing unit found within each of the input modules 111-113

The data packet 150 can include (1) a first section 151 for data from the first analog stick input (e.g., the left analog stick input), (2) a second section 152 for data from the second analog stick input (e.g., the right analog stick input), (3) a third section 153 for data from the d-pad input, and (4) an optional fourth section 154 for other purposes, such as a checksum. The checksum can be used by the input modules 111-113 and the controller 105 to verify the integrity of the data packet 150. In one embodiment, the data packet is 8 bytes long including three bytes from each analog stick input module, one byte from the d-pad input module, and one byte for the checksum.

Each input module 111-113 can be configured to enter data into a different section of the data packet 150. Each input module 111-113 can determine the section of the data packet 150 to enter data into based on one or more of (1) a type of that input module and (2) whether one or more sections of the data packet 150 already include data from one of the other input modules, such as data from an input module of the same type as the input module entering data.

In some embodiments, two or more input modules of the plurality of input modules 111-113 can each individually determine the section of the data packet 150 to enter data into based on (1) the type of that input module and (2) whether one or more sections of the data packet already include data from an input module of that type. For example, the two analog stick input modules 112, 113 can determine that the input modules 112, 113 should enter data into data sections 151, 152 respectively based on (1) the analog stick input modules 112, 113 being analog stick input modules and (2) whether data sections 151, 152 already include data from an analog stick input module. The second input module 112 is positioned in the ring network 130 to receive the data packet 150 before the third input module 113. Thus, the second input module 112 can enter data into data section 151 because no data from an analog stick input module has been entered into the first section 151 when the second input module 112 receives the data packet 150. Similarly, the third input module 113 can enter data into data section 152 because data from an analog stick input module (i.e., second input module 112) has already been entered into the first section 151 when the third input module 113 receives the data packet 150. In a second configuration 101B which is described below in reference to FIGS. 2A-2C, the second input module 112 is configured to enter data into the second section 152 of the data packet 150 because the second input module 112 is positioned after the third input module 113 in the ring network 130.

The first input module 111 is a different type of input module (i.e., a d-pad input module) from the second and third input modules 112, 113 (i.e., the analog stick input modules). The first input module 111 is configured to enter data into the third section 153 of the data packet 150 based on the first input module 111 being a different type of input module from the second input module 112 and the third input module 113. Thus, the first input module 111 enters data into the third section 153 of the data packet regardless of the position of the second input module 112. Therefore, the first input module 111 is configured to enter data into the third section 153 of the data packet 150 when the first input module 111 is connected to the ring network 130 at the first input position 121, the second input position 122, or the third input position 123.

The sections of the data packet 150 can be transmitted in data frames based on universal asynchronous receiver-transmitter (UART) communication. For example, in one embodiment, each data frame includes 8 bits of data (e.g., data identifying how the user has manipulated one of the input modules) and a parity bit surrounded by a start bit and a stop bit. The number of frames in each section can correspond to the type of input module supplying the data. For example, in one embodiment, an analog stick input module supplies three bytes of data in three data frames while a d-pad input module supplies one byte of data using a single data frame. The data packet 150 can consist of a string of back to back data frames. In some embodiments, there is no gap between the stop bit in one frame and the start bit in the next frame. The controller 105 and each input module 111-113 can each have a full-duplex UART interface with a four-pin electrical interface, such as the configuration illustrated in the connection interface 330 (discussed below), which can include a transmit pin, a receive pin, a power supply pin, and a ground pin. Each input module transmits the data packet 150 using the transmit pin of the input module after receiving the data packet 150 through the receive pin of the input module and entering data into the data packet 150.

In some embodiments of the methods described herein, the memory 117 in each of the input modules may contain instructions or data that allows the processor 115 to know that it is a certain type of input module and/or that it should populate only desired sections of a received data packet 150. Alternately, in some embodiments, the memory 117 in each of the input modules may contain instructions or data that allows the processor 115 to know that when one or more configuration bits are populated within the data packet 150 the input module knows which section of a received data packet 150 to populate with data.

The use of a four-pin electrical interface configuration can have significant advantages over conventional game controller connection configurations that typically require five or more interconnection elements (e.g., typically six interconnection elements) to allow a user input receiving device to communicate with the game controller and gaming system. Some of the advantages provided by the input module electrical interface configurations disclosed herein include, but are not limited to, a reduced number of electrical connectors (e.g., pogo pins and mating interfacing pads) which reduces input module cost, reduced hardware complexity, reduced manufacturing complexity, improved system reliability (e.g., less components that can fail during normal use or during the disclosed input module replacement process), and an even number of electrical interface connection points allows for symmetric connection point orientations (see e.g., FIG. 3B below) to be used which improves the simplicity and reliability of the input module to game controller interconnection interface.

Figure 1D:
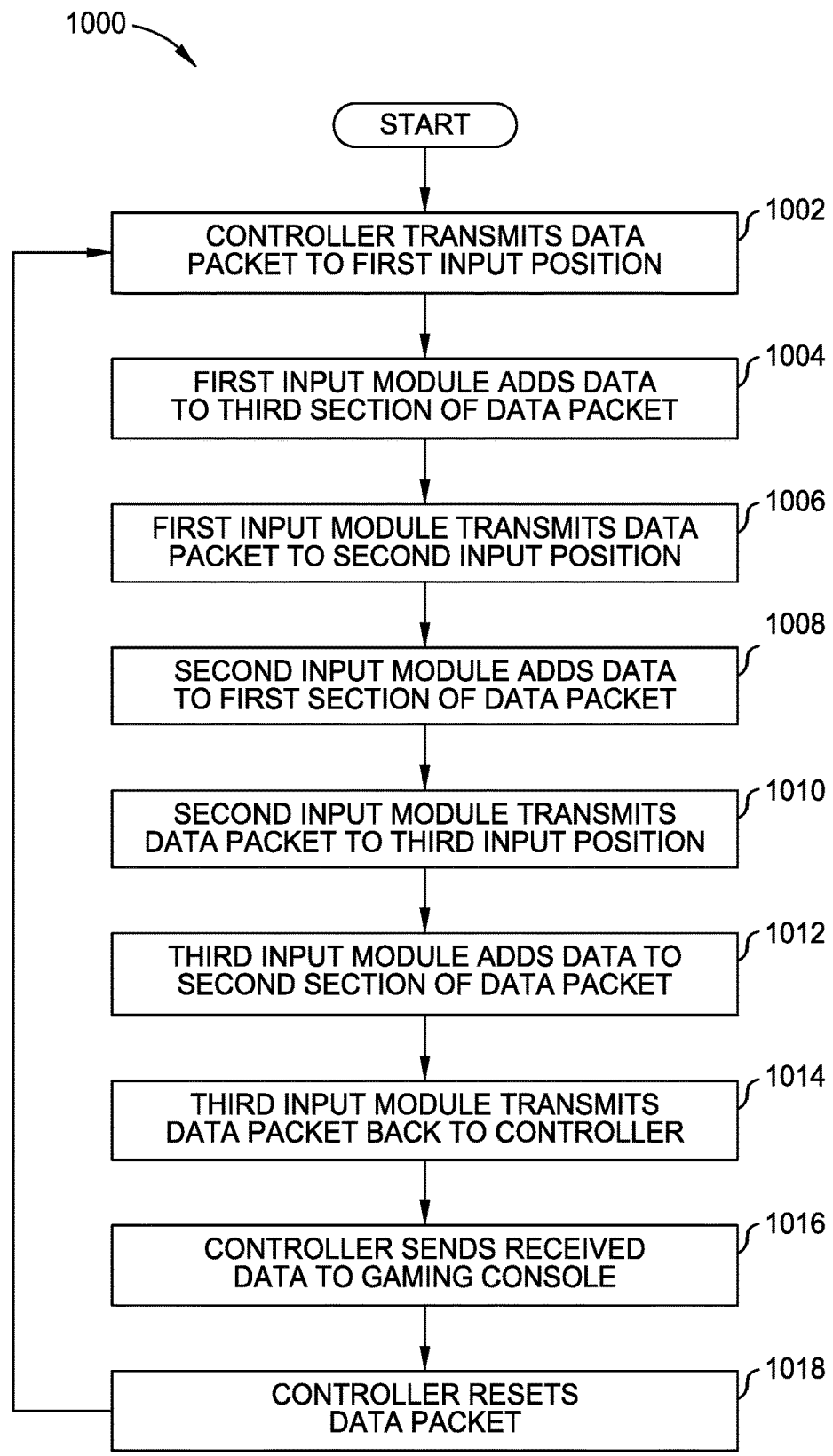
FIG. 1D is a process flow diagram of a method illustrating the communication of a data packet around a ring network, according to one embodiment.
Figure 2A:
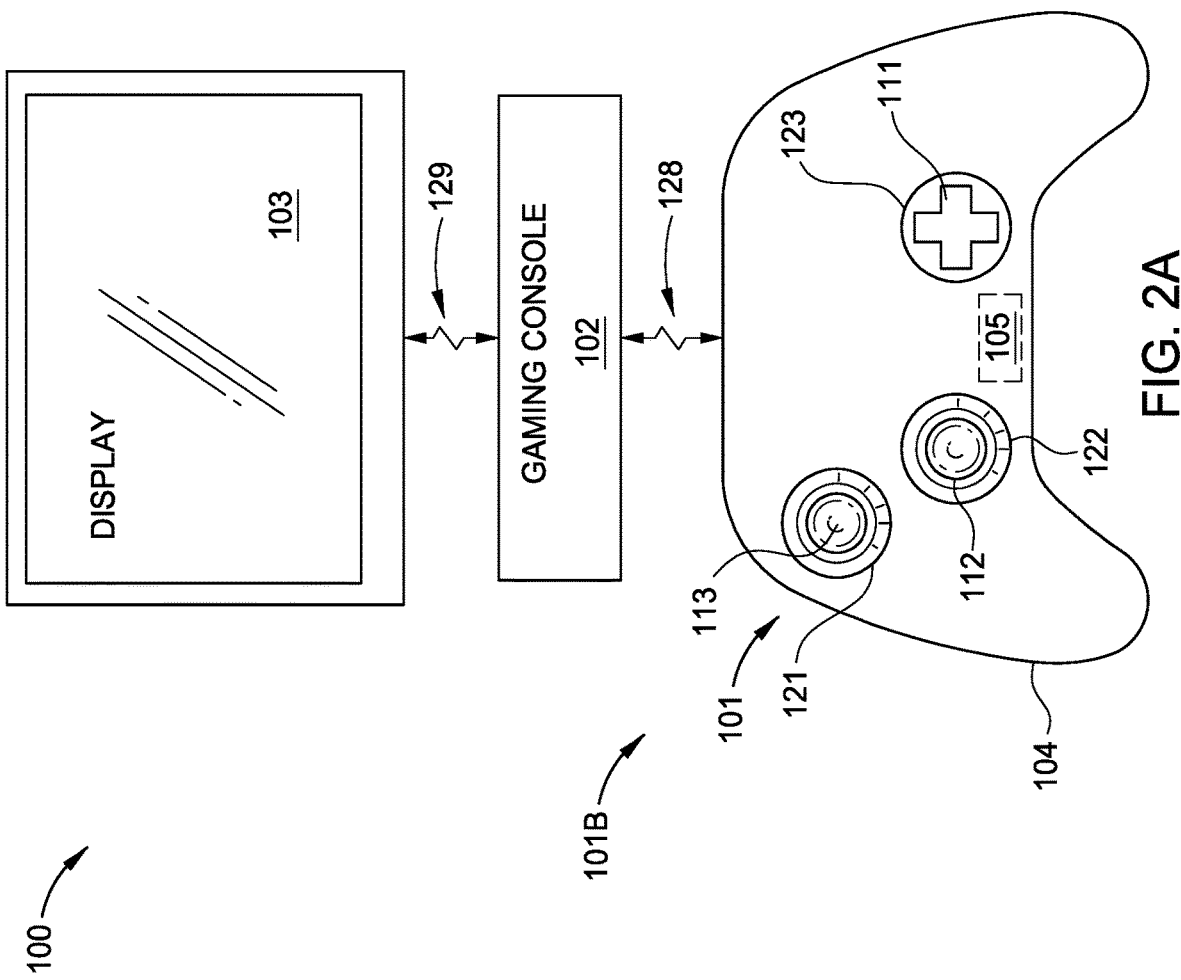
FIG. 2A is a perspective view of a video game system with the input modules arranged in a second configuration, according to one embodiment.

FIG. 1D is a process flow diagram of a method 1000 illustrating the communication of the data packet 150 around the ring network 130 when the input modules 111-113 are in the first configuration 101A shown in FIGS. 1A and 1C, according to one embodiment. At block 1002, the controller 105 transmits the data packet 150 to the input module at the first input position 121, which is the first input module 111 in the first configuration 101A. The transmitted data packet 150 can be a largely empty skeleton packet that is configured to be filled by the input modules 111-113.

At block 1004, the first input module 111 adds data to the third section 153 of the data packet 150. In this example, the first input module 111 is a d-pad input module. Upon receiving the data packet 150 from the controller 105, the first input module 111 can determine that the third section 153 of the data packet 150 has not been filled in yet. For example, in one embodiment the first input module 111 can determine that a particular bit (empty/filled bit) in the third section 153 of the data packet 150 is in a certain state (e.g., a state of zero), which can be used to identify that the third section 153 of the data packet 150 has not been filled in yet. Upon determining that the third section 153 of the data packet 150 has not been filled in yet, the first input module 111 can add data to the third section 153 of the data packet 150. This data can include data indicating how the user has manipulated the d-pad input module as well as changing the state of the empty/filled bit of the third section 153 from zero to one. Setting the empty/filled bit in the third section 153 of the data packet 150 can be useful, for example if the user tries to connect two or more d-pad inputs to the gaming controller 101 in a configuration that only supports one d-pad controller, such as the configuration 101A shown in FIGS. 1A and 1C. For example, if a d-pad input module determines that the empty/filled bit of the third section 153 is already filled in, then the additional d-pad input module can send an error message to the controller 105 and also to the gaming system 100. In one embodiment, this error message can be included in the fourth section 154 of the data packet 150, which in some embodiments can be a check sum. In another embodiment, the additional d-pad input module can simply not continue the transmission of the data packet 150 around the ring network 130. Setting the empty/filled bit in the third section 153 of the data packet 150 can also be useful in embodiments which support two or more d-pad input modules, such as a gaming controller (not shown) configured to operate two analog stick input modules and two d-pad input modules, so the data from the second d-pad input module can be entered into a different section of the data packet than the data from the first d-pad input module.

At block 1006, the first input module 111 transmits the data packet 150 to the input module positioned at the second input position 122, which is the second input module 112 in the first configuration 101A.

The second input module 112 is an analog stick input. Upon receiving the data packet 150 from the first input module 111, the second input module 112 can determine that the first section 151 of the data packet 150 has not been filled in yet. For example, in one embodiment the second input module 112 can determine that a particular bit (empty/filled bit) in the first section 151 of the data packet 150 is in a certain state (e.g., a state of zero), which can be used to identify that the first section 151 of the data packet 150 has not been filled in yet.

At block 1008, the second input module 112 adds data to the first section 151 of the data packet 150. The analog stick input modules 112, 113 can be preconfigured (e.g., factory set) to check the state of the empty/filled bit of the first section 151 of the data packet 150, so that these analog stick input modules 112, 113 can fill the first section 151 of the data packet when the first section 151 of the data packet 150 is not filled in already. Upon determining that the first section 151 of the data packet 150 has not been filled in yet, the second input module 112 can add data to the first section 151 of the data packet 150. This data can include data indicating how the user has manipulated that analog stick input module as well as changing the state of the empty/filled bit from zero to one. Setting the empty/filled bit to one can be used by the other analog stick input module (third input module 113) to determine that the first section 151 of the data packet 150 has already been filled with data from another analog stick input module when the third input module 113 receives the data packet 150.

Referring back to the method 1000 example, the first section 151 of the data packet 150 is associated with the left analog stick input module. Furthermore, the first section 151 of the data packet 150 is filled by the first analog stick input module (i.e., input module 112) to receive the data packet 150. Thus, in a configuration including two analog stick input modules, the first section 151 of the data packet 150 is filled by the first analog stick input module to receive the data packet 150 in the ring network 130 as the data packet 150 is transferred in a clockwise fashion (see FIG. 1C) around the ring network 130 regardless of whether that first analog stick input module is located at the first input position 121 or the second input position 122. Consequently, regardless of how the user arranges the input modules 111-113, the first section 151 of the data packet 150 is always filled by the leftmost analog stick input module, which enables the user to arrange the input modules 111-113 at any of the input positions 121-123 and then proceed to successfully use the gaming controller 101 without any additional device configuration steps.

At block 1010, the second input module 112 transmits the data packet 150 to the input module at the third input position 123, which is the third input module 113 in the first configuration 101A.

At block 1012, the third input module 113 adds data to the second section 152 of the data packet 150. The third input module 113 is an analog stick input module in the first configuration 101A. Upon receiving the data packet 150 from the second input module 112, the third input module 113 can determine that the first section 151 of the data packet 150 has been filled in already. For example, in one embodiment the third input module 113 can determine that the empty/filled bit in the first section 151 of the data packet 150 is in a certain state (e.g., a state of one), which can be used to identify that the first section 151 of the data packet 150 has been filled in already. Upon determining that the first section 151 of the data packet 150 has been filled in already, the third input module 113 can add data to the second section 152 of the data packet 150. This data can include data indicating how the user has manipulated the analog stick input module. In some embodiments, this data can include changing the state of an empty/filled bit in the second section 152 from zero to one. Setting the empty/filled bit to one can be useful, for example, for gaming controllers including three or more analog stick input modules.

At block 1014, the third input module 113 transmits the data packet 150 back to the controller 105 to complete the communication around the ring network 130.

At block 1016, the gaming controller 101 transmits the received data packet 150 or data derived from the data packet 150 to the gaming console 102, so that the data from the input modules 111-113 can be used as input for the software program running on the gaming console 102.

At block 1018, controller 105 resets the data packet 150 to the initial state (i.e., the largely empty skeleton packet described above) and the method 1000 can be executed again to receive the latest inputs from the user of the gaming controller 101.

Figure 1E:
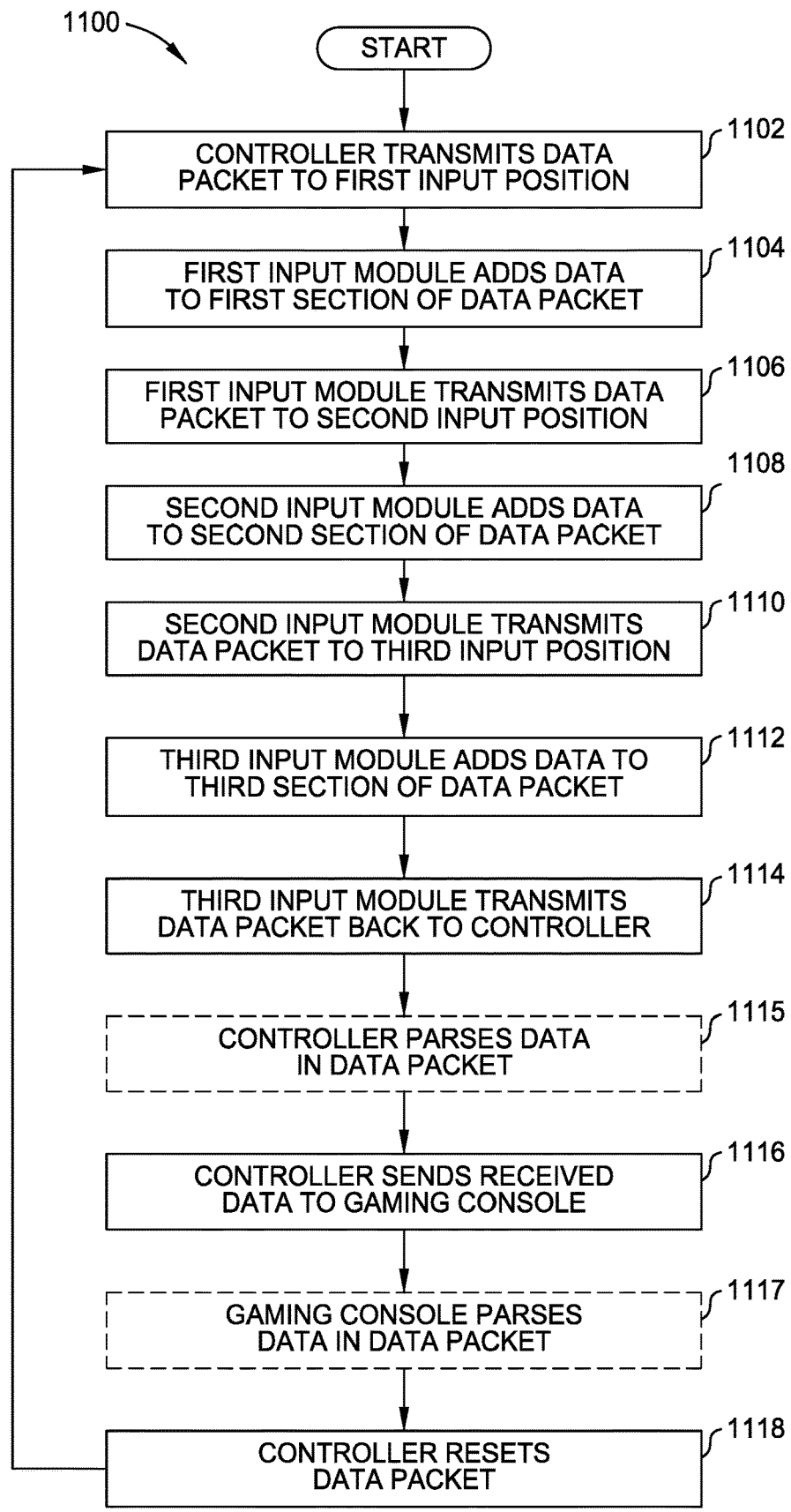
FIG. 1E is a process flow diagram of a method illustrating the communication of a data packet around a ring network, according to one embodiment.

FIG. 1E is a process flow diagram of an alternative method 1100 illustrating the communication of the data packet 150 around the ring network 130 when the input modules 111-113 are in the first configuration 101A shown in FIGS. 1A and 1C, according to one embodiment. The alternative method 1100 is similar to the method 1000 described above except that the input modules 111-113 add data to the data packet 150 in order based on the position of the input module 111-113 in the ring network 130 instead of the placement of the data in the data packet 150 being based at least partly on the type of input module 111-113 at each input position 121-123. For example, in the method 1000 described above the d-pad input module (i.e., the first input module 111) added data to the third section 153 of the data packet 150 based on the first input module 111 being a d-pad input module. Conversely, in the method 1100, the first input module 111 adds data to the next empty section of the data packet 150 without regard to the first input module 111 being a d-pad input module. The method 1100 is described in further detail below.

In some embodiments of the method disclosed herein, such as method 1100, the memory 117 in each of the input modules need not contain instructions or data that allows the processor 115 to know that it is a certain type of input module and/or the memory 117 in each of the input modules need not contain configuration bits to determine which portion of the data packet 150 to populate, since the controller 105, or the controller within the gaming console 102, can be used to determine the position of the input modules based on a determination of the type input module based on a characteristic of the gaming data placed within the data packet 150 and the order in which the gaming data input was placed within the data packet 150. For example, in one embodiment of utilizing the characteristics of the gaming data, the controller 105 can determine that the data packet 150 includes eight bytes of data including three bytes from two analog input modules, one byte from a d-pad input module, and one checksum byte. Continuing the example, the bytes from the analog stick modules and the byte from the d-pad input modules can have characteristics that enable the controller 105 to recognize these byte(s) as coming from a particular type of input module, such as the analog-stick input module or the d-pad input module. For example, each input module can use a start and/or a stop bit, the controller 105 can determine which data is from which input module based on the length of data between consecutive start and/or stop bits. Furthermore, the checksum byte if used can always be the last byte. Thus, in some embodiments, the input modules can just add data to the next empty section of the data packet 150 and the controller 105 can determine which data comes from the different input modules based on characteristics of the data (e.g., the length or configuration of data from different input modules).

At block 1102, the controller 105 transmits the data packet 150 to the input module at the first input position 121, which is the first input module 111 in the first configuration 101A. The transmitted data packet 150 can be a largely empty skeleton packet that is configured to be filled by the input modules 111-113.

At block 1104, the first input module 111 adds data to the first section 151 of the data packet 150. The first input module 111 is d-pad input module. Upon receiving the data packet 150 from the controller 105, the first input module 111 can determine that the first section 151 of the data packet 150 has not been filled in yet. For example, in one embodiment the first input module 111 can determine that a particular bit (empty/filled bit) in the first section 151 of the data packet 150 is in a certain state (e.g., a state of zero), which can be used to identify that the first section 151 of the data packet 150 has not been filled in yet.

In the method 1100, each input module 111-113 can be preconfigured (e.g., factory set) to check the state of the empty/filled bit of each section 151-153 of the data packet 150, so that input modules 111-113 can fill the next empty section (i.e., the first section 151 here) of the data packet when the first section 151 of the data packet 150 is not filled in already. Upon determining that the first section 151 of the data packet 150 has not been filled in yet, the first input module 111 can add data to the first section 151 of the data packet 150. This data can include data indicating how the user has manipulated the d-pad input module as well as changing the state of the empty/filled bit from zero to one. Setting the empty/filled bit to one can be used by the other input modules (input modules 112, 113) to determine that the first section 151 of the data packet 150 has already been filled with data from another input module when the other input modules 112, 113 receive the data packet 150.

In some embodiments, the data provided to the first section 151 by the first input module 111 only includes gaming data generated by the sensors and/or related processing components found within an input module. In one example, in block 1104 the data provided to the data packet 150 only includes gaming data created from sensors that are used to detect the user's manipulation of the d-pad input module, such as electrical signal data generated by hardware components coupled to the d-pad within the first input module 111. The signal data provided to the first section 151 may be provided in a format that will allow the processing unit in the controller 105 or gaming console 102 to determine what type of input module has provided the data found within a section of the data packet 150 based on a signal characteristic of the provided data. In one example, in block 1104 the data provided to the data packet 150 only includes gaming data created from the sensors that are used to detect the user's manipulation of the buttons on the d-pad, such as electrical signal data generated by switches found within the electrical hardware of the d-pad.

At block 1106, the first input module 111 transmits the data packet 150 to the input module positioned at the second input position 122, which is the second input module 112 in the first configuration 101A.

At block 1108, the second input module 112 adds data to the second section 152 of the data packet 150. In this example, the second input module 112 is an analog stick input module. Upon receiving the data packet 150 from the first input module 111, the second input module 112 can determine that the second section 152 of the data packet 150 has not been filled in yet. For example, in one embodiment the second input module 112 can determine that a particular bit (empty/filled bit) in the second section 152 of the data packet 150 is in a certain state (e.g., a state of zero), which can be used to identify that the second section 152 of the data packet 150 has not been filled in yet. Upon determining that the second section 152 of the data packet 150 has not been filled in yet, the second input module 112 can add data to the second section 152 of the data packet 150. This data can include data indicating how the user has manipulated the analog stick input module as well as changing the state of the empty/filled bit of the second section 152 from zero to one.

As similarly discussed above, in some embodiments, the data provided to the second section 152 by the second input module 112 may only include gaming data generated by the sensors and/or related processing components found within the input module 112. In one example, the signal data provided to the first section 152 may include a signal characteristic that is based on or be derived from analog data provided from a first type of analog sensor (e.g., potentiometer type of sensor) disposed within the input module 112, and thus has a signal characteristic that is different from a signal received from a second type of analog sensor (e.g., optical or inductive type of sensor) or a signal generated from a different type of sensor that is used to detect a user's input.

At block 1110, the second input module 112 transmits the data packet 150 to the input module at the third input position 123, which is the third input module 113 in the first configuration 101A.

At block 1112, the third input module 113 adds data to the third section 153 of the data packet 150. The third input module 113 is an analog stick input module. Upon receiving the data packet 150 from the second input module 112, the third input module 113 can determine that the third section 153 of the data packet 150 has not been filled in already. Upon determining that the third section 153 of the data packet 150 has not been filled in already, the third input module 113 can add data to the third section 153 of the data packet 150. This data can include data indicating how the user has manipulated the analog stick input module. In some embodiments, this data can include changing the state of an empty/filled bit in the third section 153 from zero to one. Setting the empty/filled bit to one can be useful, for example, for gaming controllers including four or more input modules.

As similarly discussed above, in some embodiments, the data provided to the third section 153 by the third input module 113 may only include gaming data generated by the sensors and/or related processing components found within the input module 113. In one example, in block 1112 the data provided to the data packet 150 only includes gaming data created from the sensors that are used to detect the user's manipulation of the analog stick input module, such as electrical signal data generated by hardware components coupled to the analog stick within the first input module 113.

At block 1114, the third input module 113 transmits the data packet 150 back to the controller 105 to complete the communication around the ring network 130.

At block 1115, the controller 105 optionally parses the data packet 150 to determine what data came from the different input modules 111-113. In one embodiment, during block 1115 the controller 105 can determine, based on a signal characteristic of all of the received signal data, that the third input module 113 is similar to the second input module 112, both the second input module 112 and the third input module 113 are analog stick types of input modules, the second and third input modules 112, 113 are different from the first input module 111, and/or the first input module 111 is a d-pad before transmitting the data packet 150 to the gaming console.

At block 1116, the gaming controller 101 transmits the received data packet 150 or data derived from the data packet 150 to the gaming console 102, so that the data from the input modules 111-113 can be used as input for the software program running on the gaming console 102.

At block 1117, the gaming console 102 optionally parses the data packet 150 to determine what data came from the different input modules 111-113 if the controller 105 did not parse the data packet in block 1115. The parsing performed by the gaming console 102 can be performed similarly as described above for block 1115 for the parsing performed by the controller 105. The data provided from the gaming console 101 can then be used as input for the software program running on the gaming console 102.

At block 1118, controller 105 resets the data packet 150 to the initial state (i.e., the largely empty skeleton packet described above) and the method 1100 can be executed again to receive the latest inputs from the user of the gaming controller 101.

FIG. 2A is a perspective view of the video game system 100 with the input modules 111-113 in a second configuration 101B, according to one embodiment. FIG. 2B is a block diagram of the gaming controller 101 in the second configuration 101B illustrating how data is transferred between the input modules 111-113 and the controller 105, according to one embodiment. FIGS. 2A and 2B show the input modules 111-113 arranged in the second configuration 101B in a ring network 230 with the input modules 113, 112, 111 located at input positions 121, 122, 123, respectively. In the second configuration 101B, the third input module 113 is placed in the first input position 121, the second input module 112 is located in the second input position 122, and the first input module 111 is located in the third input position 123. Although the input modules 111-113 have been rearranged in the second configuration 101B relative to the first configuration 101A, the data from the left analog stick input module, the right analog stick input module, and the d-pad input module are entered into the correct sections of the data packet 150 without the user having to take any additional device configuration steps other than simply switching the positions of the input modules 111-113 as described in reference to FIG. 2C below.

Figure 2C:
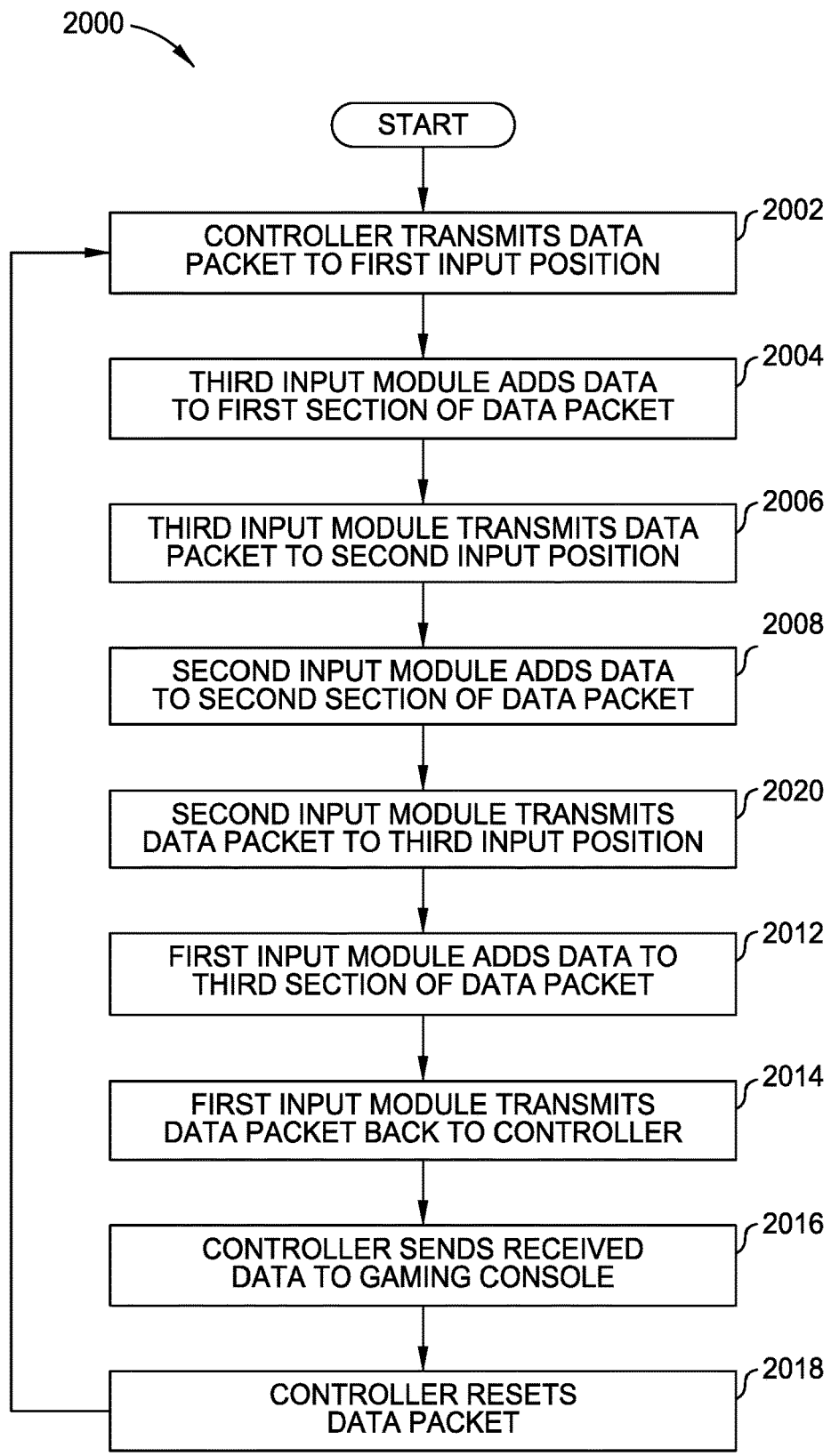
FIG. 2C is a process flow diagram of a method illustrating the communication of a data packet around the ring network when the input modules are in the second configuration shown in FIGS. 2A and 2B, according to one embodiment.

FIG. 2C is a process flow diagram of a method 2000 illustrating the communication of the data packet 150 around the ring network 230 when the input modules 111-113 are arranged in the second configuration 101B shown in FIGS. 2A and 2B, according to one embodiment.

At block 2002, the controller 105 transmits the data packet 150 to the input module at the first input position 121, which is the third input module 113 in the second configuration 101B.

At block 2004, the second input module 113 adds data to the first section 151 of the data packet 150. In this example, the third input module 113 is an analog stick input module. Upon receiving the data packet 150 from the controller 105, the third input module 113 can determine that the first section 151 of the data packet 150 has not been filled in yet. For example, in one embodiment the third input module 113 can determine that a particular bit (empty/filled bit) in the first section 151 of the data packet 150 is in a certain state (e.g., a state of zero), which can be used to identify that the first section 151 of the data packet 150 has not been filled in yet. Upon determining that the first section 151 of the data packet 150 has not been filled in yet, the third input module 113 can add data to the first section 151 of the data packet 150. This data can include data indicating how the user has manipulated the analog stick input module as well as changing the state of the empty/filled bit from zero to one. Setting the empty/filled bit to one can be used by the other analog stick input module (second input module 112) to determine that the first section 151 of the data packet 150 has already been filled with data from another analog stick input module when the second input module 112 receives the data packet 150.

As discussed above, the first section 151 of the data packet 150 is associated with the left analog stick input module. Here at block 2004 in the second configuration 101B, the data entered into the first section 151 from the third input module 113 is automatically designated as coming from the left analog stick input module even though the third input module 113 was the right analog stick input module in the first configuration 101A described above in reference to FIGS. 1A-1D. The user thus does not need to perform any device configuration steps in order for the data from the third input module 113 to be designated as coming from the left analog stick input module other than positioning the third input module 113 as the left analog stick input module on the gaming controller 101. Thus, the position of the data supplied in the data packet 150 can be used by the controller 105 or gaming console 102 to help determine the input modules position within the gaming controller 101, and if the input module knows what type of input module it is, it can place its data in a predefined section of the data packet 150 reserved for its type of input module.

At block 2006, the third input module 113 transmits the data packet 150 to the input module at the second input position 122, which is the second input module 112 in the second configuration 101B.

At block 2008, the second input module 112 adds data to the second section 152 of the data packet 150. The second input module 112 is an analog stick input in configuration 101B. Upon receiving the data packet 150 from the third input module 113, the second input module 112 can determine that the first section 151 of the data packet 150 has been filled in already. For example, in one embodiment the second input module 112 can determine that the empty/filled bit in the first section 151 of the data packet 150 is in a certain state (e.g., a state of one), which can be used to identify that the first section 151 of the data packet 150 has been filled in already. Upon determining that the first section 151 of the data packet 150 has been filled in already, the second input module 112 can add data to the second section 152 of the data packet 150. This data can include data indicating how the user has manipulated the analog stick input module. Because the data from the second input module 112 is added to the second section 152 of the data packet 150, the data from the second input module 112 is automatically designated as coming from the right analog stick input module based on the position of the second input module 112 in the ring network 230 relative to the position of the third input module 113. Importantly, no additional device configuration steps are required by the user to designate the data coming from the second input module 112 as coming from the right analog stick input module other than positioning the second input module 112 after the third input module 113 in the ring network 230 (i.e., to the right of the third input module 113 in the views shown in FIGS. 2A and 2B).

At block 2010, the second input module 112 transmits the data packet 150 to the input module at the third input position 123, which is the first input module 111 in the second configuration 101B.

At block 2012, the first input module 111 adds data to the third section 153 of the data packet 150. The first input module 111 is a d-pad input module. Upon receiving the data packet 150 from the second input module 112, the first input module 111 can determine that the third section 153 of the data packet 150 has not been filled in yet. For example, in one embodiment the first input module 111 can determine that a particular bit (empty/filled bit) in the third section 153 of the data packet 150 is in a certain state (e.g., a state of zero), which can be used to identify that the third section 153 of the data packet 150 has not been filled in yet. Upon determining that the third section 153 of the data packet 150 has not been filled in yet, the first input module 111 can add data to the third section 153 of the data packet 150. This data can include data indicating how the user has manipulated the d-pad input module as well as changing the state of the empty/filled bit from zero to one.

The first input module 111 (i.e., the d-pad input module) can be placed in any of the input positions 121-123, and the data from the first input module 111 is designated as coming from the d-pad input module because the data from the first input module 111 is entered into the third section 153 of the data packet 150.

At block 2014, the first input module 111 transmits the data packet 150 back to the controller 105 to complete the communication around the ring network 230. At block 2016, the gaming controller 101 transmits the received data packet 150 or data derived from the data packet 150 to the gaming console 102, so that the data from the input modules 111-113 can be used as input for the software program running on the gaming console 102.

At block 2018, controller 105 resets the data packet 150 to the initial state (i.e., the largely empty skeleton packet described above) and the method 2000 can be executed again to receive the latest inputs from the user of the gaming controller 101.

Thus, as shown through at least the description of FIGS. 1D and 2C, a user can place the input modules 111-113 in different arrangements in the input positions 121-123 of the gaming controller 101, and the data from these three input modules 111-113 is properly sorted to designate which data comes from the left analog stick input, the right analog stick input, and the d-pad input of the gaming controller without any additional device configuration steps required by the user other than simply switching the positions of two or more of the input modules 111-113. The sequential nature of the ring networks 130, 230 ensures that the analog stick input module that is to the left of the other analog stick input module is always designated as the left analog stick input module. Furthermore, the data from the d-pad input module is always placed in the same section of the data packet 150 regardless of the input position 121-123 that receives the d-pad input module. Moreover, although the disclosure above described embodiments of gaming controllers having three input modules, the advantages of this disclosure can be applied to gaming controllers having two input modules or more than three input modules.

Additionally, the advantages can be applied to gaming controllers having multiple sets of input modules of the same type, such as a gaming controller including two analog stick input modules and two d-pad input modules. Following the same concepts described above, the data from these multiple sets of input modules can be properly sorted by arranging the input modules to communicate on a ring network on which each input module enters data into a data packet, and each input module determines the section of the data packet to enter data into based on (1) a type of that input module and (2) whether one or more sections of the data packet already include data from one of the input modules.

Figure 3A:
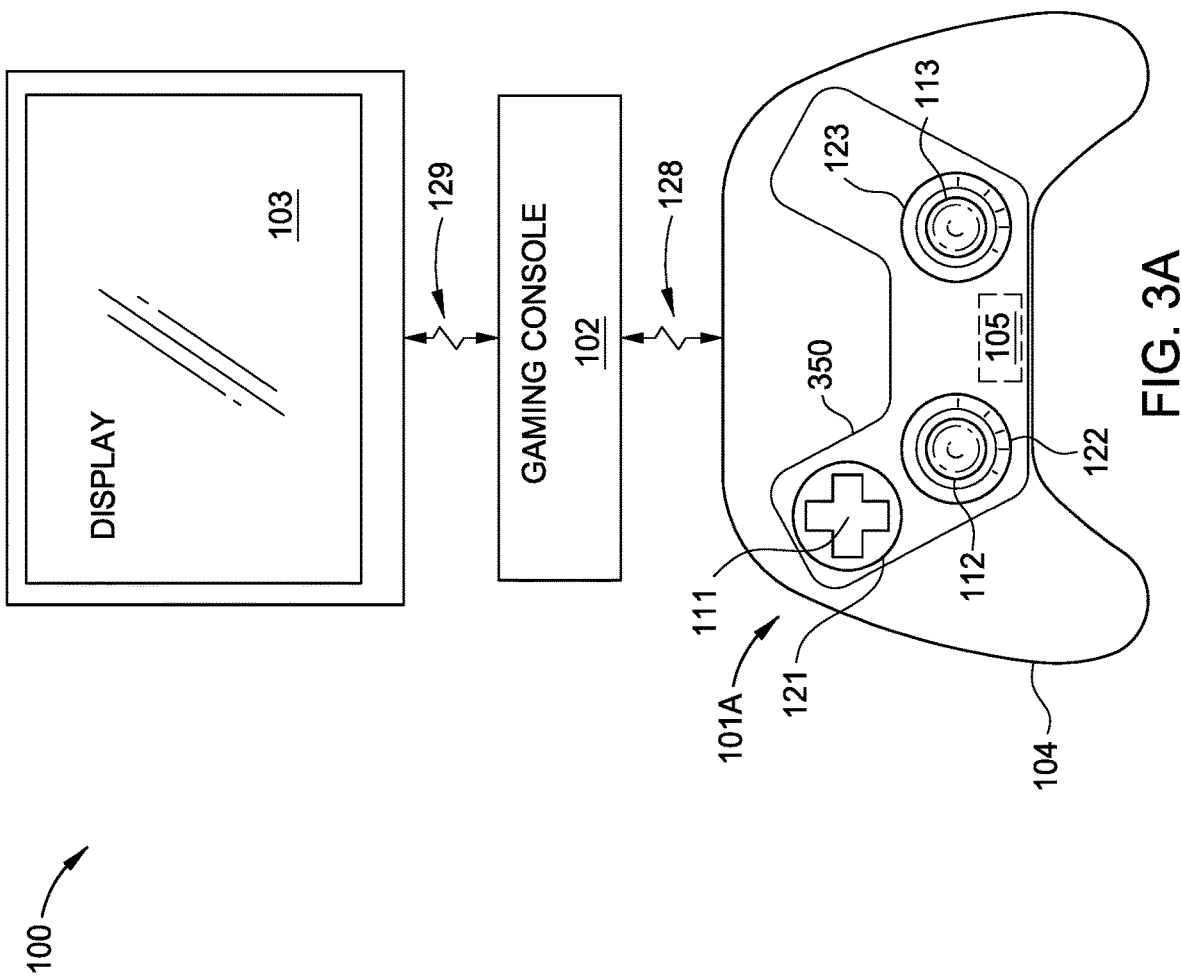
FIG. 3A is a top view of the gaming controller of FIG. 1A showing additional detail of the gaming controller, according to one embodiment.

FIG. 3A is a view of the video game system 100 of FIG. 1A showing additional detail of the gaming controller 101, according to one embodiment. As shown in FIG. 3A, the gaming controller 101 further includes a faceplate 350. The faceplate 350 can be used to secure the input modules 111-113 to the gaming controller 101. Furthermore, the faceplate 350 can be removed by the user to allow replacement or repositioning of the input modules 111-113 in the input positions 121-123 of the gaming controller 101.

Figure 3B:
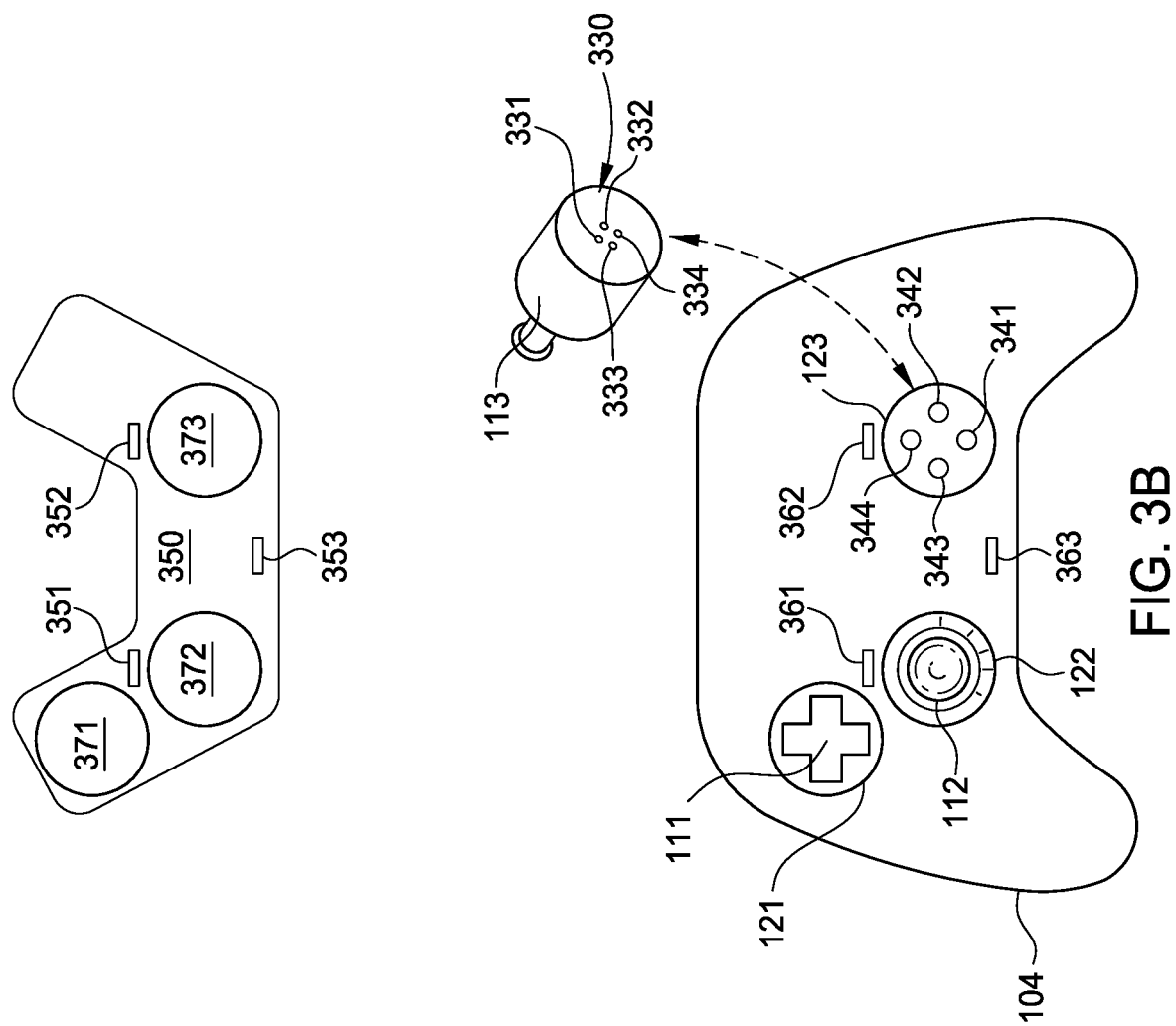
FIG. 3B is an exploded view of the gaming controller shown in FIG. 3A, according to one embodiment.

FIG. 3B is an exploded view of the gaming controller 101 shown in FIG. 3A, according to one embodiment. In FIG. 3B, the faceplate 350 and the third input module 113 have been removed from the gaming controller 101. The faceplate 350 can include a plurality of clips 351-353 that can fit into a plurality of recesses 361-363 in the housing 104 of the gaming controller 101, so that the faceplate 350 can easily be removed and secured to the gaming controller 101 by the user. Faceplate 350 can further include a plurality of retaining slots 371-373 that can be positioned over the corresponding input modules 111-113. Each retaining slot 371-373 can have a smaller diameter or cross-sectional dimension than an outer ring or other feature of the input modules 111-113, so that the portions of the faceplate 350 just beyond the slots 371-373 clamps down on the input modules 111-113 when the faceplate 350 is secured to the gaming controller 101.

When the faceplate 350 is removed from the gaming controller 101, the input modules 111-113 can be easily removed from the gaming controller 101. For example, as shown in FIG. 3B, the third input module 113 is shown as being removed from the third input position 123. In one embodiment, the input modules 111-113 can be removed from the corresponding input positions 121-123 by simply pulling the input modules 111-113 away from the corresponding input positions 121-123 when the faceplate 350 is removed from the gaming controller 101.

The input modules, such as the third input module 113 can include a connection interface 330 that includes a plurality of electrical contact elements, such as, for example, a plurality of pins 331-334. The plurality of pins 331-334 can correspond to the four-pin electrical interface described above that includes a transmit pin, a receive pin, a power supply pin, and a ground pin. The plurality of pins 331-334 can make electrical connections with a corresponding plurality of pads 341-344 within the third input position 123. Each input module 111-113 can include the same plurality of pins 331-334, and each input position 121-123 can include the plurality of pads 341-344, so that the pins 331-334 of each input module 111-113 can make electrical connection with the pads 341-344 of each input position 121-123. Alternately, in some embodiments, a plurality of pads 341-344 can be formed at the connection interface of an input module so that they will form an electrical connection with a corresponding plurality of pins 331-334 disposed within a corresponding input position within the gaming controller. Although not shown, each input module 111-113 and each input position 121-123 can be keyed to ensure that the correct pin 111-113 makes electrical connection with the correct pad 121-123 when each input module 111-113 is inserted into a corresponding one of the input positions 121-123.

While the foregoing is directed to embodiments of the present disclosure, other and further embodiments of the disclosure may be devised without departing from the basic scope thereof, and the scope thereof is determined by the claims that follow.

What is claimed is:

1. A gaming controller comprising:
a module controller;
a plurality of input positions; and
a plurality of input modules, each input module configured to receive user input and generate information comprising gaming data based on the user input, wherein
the plurality of input modules are connected to the module controller to form a ring network of interconnected input modules,
each of the plurality of input modules is connected to the ring network through a different one of the plurality of input positions,
each input module is configured to enter the generated information into a different section of a data packet that is sequentially transferred around the ring network, and
each input module is configured to determine the section of the data packet to enter the information into based on one or more of (1) a type of that input module and (2) whether one or more sections of the data packet already include data from one of the input modules.

2. The gaming controller of claim 1, wherein two or more input modules of the plurality of input modules each individually determine the section of the data packet to enter data into based on (1) the type of that input module and (2) whether one or more sections of the data packet already include information from an input module of that type.

3. The gaming controller of claim 2, wherein the two or more input modules are each a first type of input module.

4. The gaming controller of claim 2, wherein the two or more input modules are each an analog stick input module.

5. The gaming controller of claim 2, wherein
the two or more input modules are each a first type of input module,
the two or more input modules include a first input module and a second input module,
the first input module is positioned in the ring network to receive the data packet before the second input module,
the first input module is configured to enter information into a first section of the data packet based on determining an input module of the first type has not entered information into the data packet, and
the second input module is configured to enter data into a second section of the data packet based on determining an input module of the first type has entered information into the data packet.

6. The gaming controller of claim 1, wherein
the plurality of input modules includes a first input module and a second input module that are a same type of input module,
the first input module is configured to enter information into a first section of the data packet when the first input module is positioned before the second input module in the ring network, and
the first input module is configured to enter information into a second section of the data packet when the first input module is positioned after the second input module in the ring network.

7. The gaming controller of claim 6, wherein
the second input module is configured to enter information into the first section of the data packet when the second input module is positioned before the first input module in the ring network, and
the second input module is configured to enter information into the second section of the data packet when the second input module is positioned after the first input module in the ring network.

8. The gaming controller of claim 6, wherein
the plurality of input modules includes a third input module,
the third input module is a different type of input module from the first input module and the second input module, and
the third input module is configured to enter data into a third section of the data packet based on the third input module being a different type of input module from the first input module and the second input module.

9. The gaming controller of claim 8, wherein
the plurality of input positions includes a first input position, a second input position, and a third input position, and
the third input module is configured to enter information into the third section of the data packet when the third input module is connected to the ring network at the first input position, the second input position, or the third input position.

10. The gaming controller of claim 8, wherein the third input module is a d-pad input module.

11. A method of operating a gaming controller, comprising:
transmitting a data packet from a module controller to a first input module of a plurality of input modules positioned within a ring network, wherein the ring network comprises the module controller, the first input module and a second input module, and the first and second input modules are connected to the ring network through a different one of a plurality of input positions formed on the gaming controller; and
entering information into the data packet by each of the first and second input modules, wherein
the entered information comprises gaming data,
the first and second input modules are each configured to enter the information into a different section of the data packet, and
the first and second input modules each determine the section of the data packet to enter the information into based on one or more of (1) a type of input module and (2) whether one or more sections of the data packet already include data from one of the first or second input modules.

12. The method of claim 11, wherein the first and second input modules each individually determine the section of the data packet to enter the information into based on (1) the type of that input module and (2) whether one or more sections of the data packet already include data from an input module of that type.

13. The method of claim 12, wherein the first and second input modules are each a first type of input module.

14. The method of claim 12, wherein the first and second input modules are each an analog stick input module.

15. The method of claim 12, wherein
the first and second input modules are each a first type of input module,
the first input module is positioned in the ring network to receive the data packet before the second input module,
the first input module is configured to enter the information into a first section of the data packet based on determining an input module of the first type has not entered information into the data packet, and
the second input module is configured to enter the information into a second section of the data packet based on determining an input module of the first type has entered the information into the data packet.

16. The method of claim 11, wherein
the first input module and the second input module are a same type of input module,
the first input module is configured to enter the information into a first section of the data packet when the first input module is positioned before the second input module in the ring network, and
the first input module is configured to enter the information into a second section of the data packet when the first input module is positioned after the second input module in the ring network.

17. The method of claim 16, wherein
the second input module is configured to enter the information into the first section of the data packet when the second input module is positioned before the first input module in the ring network, and
the second input module is configured to enter the information into the second section of the data packet when the second input module is positioned after the first input module in the ring network.

18. The method of claim 16, wherein
the plurality of input modules includes a third input module,
the third input module is a different type of input module from the first input module and the second input module, and
the third input module is configured to enter the information into a third section of the data packet based on the third input module being a different type of input module from the first input module and the second input module.

19. The method of claim 18, wherein
the plurality of input positions includes a first input position, a second input position, and a third input position, and
the third input module is configured to enter the information into the third section of the data packet when the third input module is connected to the ring network at the first input position, the second input position, or the third input position.

20. The method of claim 18, wherein the third input module is a d-pad input module.

21. An input module configured to be replaceably positioned at an input position on a gaming controller, comprising:
a connection interface comprising four electrical connection elements that are configured to mate with corresponding electrical connection elements disposed within the input position of the gaming controller; and
an input module controller that is configured to receive a signal received at a first electrical connection element of the four electrical connection elements and transmit a signal to a second electrical connection element of the four electrical connection elements, wherein the input module controller comprises:
a sensor that is configured to detect input provided from a user of the gaming controller and generate gaming data based on the input provided from the user;
a processing unit; and
a non-volatile memory having a number of instructions stored therein which, when executed by the processing unit, causes the input module to perform operations comprising:
entering information into a data packet received at the first electrical connection element, wherein the entered information comprises the gaming data generated by the sensor; and transmitting the data packet containing the entered information to the second electrical connection element.

22. The input module of claim 21, wherein entering information into a data packet comprises:
determining a section of the data packet to enter the information into based on one or more of (1) information stored in memory relating to a type of input module the input module is and (2) whether one or more sections of the data packet already include data from another input module.

* * * * *